F. G. PERKINS, DEC'D,
G. S. PERKINS, EXECUTRIX.
GLUE JOINT.
APPLICATION FILED MAY 17, 1912.
Reissued July 16, 1912.
13,443.
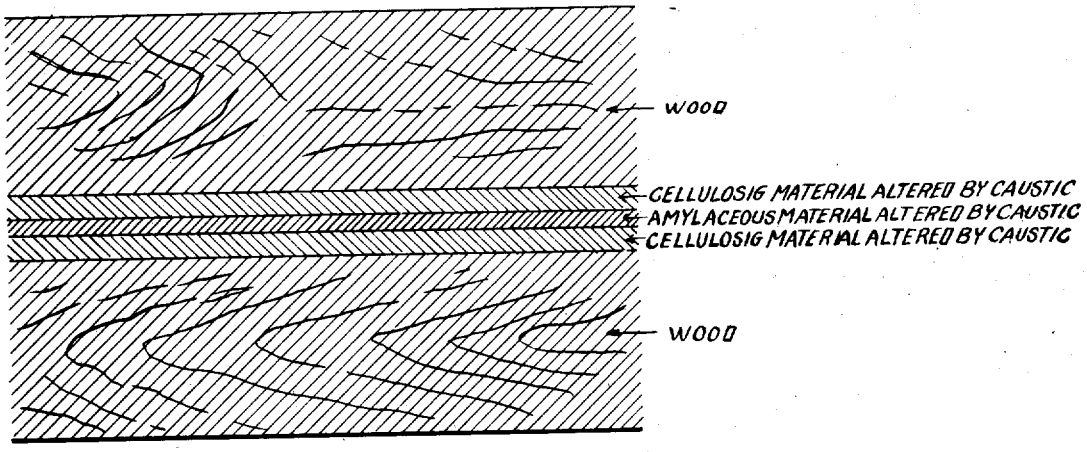
WITNESSES
Geo. M. Harris
John D. Gempler
INVENTOR
Frank G. Perkins, Dec'd
Gertrude S. Perkins, Executrix
BY
Kenyon & Kenyon
ATTORNEYS

UNITED STATES PATENT OFFICE.

FRANK G. PERKINS, DECEASED, LATE OF LANSDALE, PENNSYLVANIA, BY GERTRUDE S. PERKINS, OF SOUTH BEND, INDIANA, EXECUTRIX, AND PERKINS GLUE COMPANY, A CORPORATION OF PENNSYLVANIA, ASSIGNEE.

GLUE JOINT.

13,443. Specification of Reissued Letters Patent. Reissued July 16, 1912.

Original No. 1,020,657, dated March 19, 1912, Serial No. 659,043. Application for reissue filed May 17, 1912. Serial No. 698,051.

*To all whom it may concern:*

Be it known that FRANK G. PERKINS, deceased, late a citizen of the United States, and a resident of Lansdale, borough of Lansdale, State of Pennsylvania, did invent certain new and useful Improvements in Glue Joints, of which the following is a specification.

The invention relates to improvements in glue joints and particularly to glue joints in which cellulosic material such as wood, forms one or both sides of the joint.

The joint is made or formed by properly applying to the pieces to be united a glue such as is described or claimed in application Serial No. 460,737 filed November 2, 1908, and in application Ser. No. 460,738, filed Nov. 2, 1908. The glue described in said prior applications is made from a vegetable carbohydrate base, and one object of this invention is to provide a joint made from such a glue, which joint is much stronger than those previously made with so called adhesives made from vegetable material, or even stronger than those made from animal glue, and also one which is less affected by natural humidity changes.

Further objects, features and advantages will more clearly appear from the detailed description given below taken in connection with the accompanying drawing which forms a part of this specification.

In order that a clear understanding of the improved glue joint may be had a full and clear description of the way in which the vegetable glue is made and used to produce the joint will first be given.

When a carbohydrate of the preferred kind is first taken it is treated with a reagent to decrease its water absorptive properties in the sense that to render fluid the finished glue, comparatively little water will have to be added and the final glue will not thereby become seriously diluted. The effect of this treatment is also that it decreases the viscosity of the glue produced with a given amount of water without detriment to its "tack," quick adhesive properties and cohesion. As a base it is preferred to use the carbohydrate secreted by the cassava plant, which has peculiar properties and advantages for this purpose. After being treated as above it may at once be dissolved, but is preferably separated and dried for transport. Then the dried material may be mixed with a small amount of water and with a solvent of amylo-cellulose, such as caustic alkali, and a glue produced, the strength of which when dry is superior to the lateral strength of wood fiber. This is given as a measure of the tensile strength of the joint after the glue has been properly applied and dried to form a joint, in that we say the glue itself or the joint made therewith has a strength greater than the lateral strength of wood, that is, taking the various woods in customary use as a whole and determining the average lateral or splitting strength of these woods, the tensile strength per square inch of the new glue joint made with the glue is greater than said lateral strength. This distinguishes the joint from adhesions made with mucilages, sizes and pastes. The prepared glue is very stable in its physical condition, so much so, that it may be kept for days or even weeks after it has been mixed for application without fermentative change. By the process in its preferred form the glue is free from the complications which attend the use of an adhesive which must be cooked or warmed before use, or kept warm during use, and is more powerful than that which results from the treatment of starch in other ways. The improved glue when made in its best form and properly applied will not only tear away the wood at some point in the wood joint produced by the use of this glue, but will tear away the wood at many points whether with or against the grain.

In carrying out one embodiment of the invention the cassava carbohydrate or flour in dry form is taken and to it is added at least an equal weight of water. The batch is then agitated and heated to about 130° F., which is below the bursting temperature of the starch. Then there is slowly added from 2% to 3% by weight (of the raw carbohydrate) of strong sulfuric acid. This may be considerably diluted if desired before it is added. The same is kept in continual agitation. The agitation preferably produced by thorough stirring is continued for from four to six hours after the acid has been added and then the acid may be neutralized by the addition of a small amount of caustic soda or similar alkali. The acid acts upon the starch or carbohydrate to decrease its water absorptive properties. As the acid appears to remain unchanged in the batch, until neutralized, it is believed it acts catalytically to change the molecular condition of the carbohydrate without rendering it substantially soluble in the water. However, great care must be exercised not to have the heat sufficient or the acid in such quantity as to put the starch or carbohydrate in solution. If the action of the acid and heat is carried too far the starch will be changed into soluble starch or into dextrin, and will go into solution to a very material extent if not altogether, and as such it would be lost to the process, as there is utilized only the suspended material. Even this would cease to have the desired properties if the action were carried too far. That a large part, if not all, of the starch does not, in the improved process, go into solution, is shown by its settling upon stopping the agitation and by the weight and analysis of the product yielded. Sulfuric and other acids are stated to have a catalytic action affecting the molecular state of amylose or its state of hydration. This is believed to be promoted and equalized by prolonged agitation both together with the action of heat, removing constituents or destroying states of aggregation or polymerization, which are detrimental to the use of the carbohydrate as a glue base. The amount of alkali used, for the making of the glue base is only enough to neutralize the acid. After this has been added, the batch may then be cooled, drained and dried and kept in dry form until ready for use.

It is found that the carbohydrate secreted by the cassava plant and known as cassava flour has many advantages over other starches or starchy products and its use is preferred. Other starchy products from the cassava plant are found to be more or less adaptable and even other starchy products may be used with some little success but they do not produce glues so tenacious and are otherwise more or less undesirable. Some are affected by impurities.

The above forms the first part of the improved process and the various steps therein may all be carried out at the factory. In commercial use the dry material, obtained as above, is preferably shipped to the consumer who carries out the second part of the process at the place where the glue is to be used, but if desired the first and second parts of the improved process may be carried out together.

In carrying out the remaining steps in the preparation of the improved glue, the dried base, obtained in any suitable manner as above illustrated, may be mixed with about three parts or less by weight (of dried base) of water according to the strength of the joint and economy desired. The dried base does not materially go into solution in the water unless heat is applied, but a liquid suspension is thereby formed which is agitated and is then treated with a solvent of cellulose, as for example, an aqueous solution of caustic soda or potash, alkaline to phenolphthalein, using if cold from six to ten per cent. of the weight of the dry base, of caustic soda or its equivalent of caustic potash. The alkali, it is believed, acts chemically to unite with one or more starch molecules and with the water to form a colloidal compound. The alkali is best added in the form of a solution of from 33% to 50% strength. Sodium and potassium hydrates are the most available and among the most powerful of the known solvents of the starch cellulose and are well adapted for most purposes. To take a specific example, a given quantity, say 100 lbs. of the dried amylaceous base was mixed with from 100 to 300 lbs. of water (preferably 225 lbs. or less). After the mixture was thoroughly agitated, 10 lbs. of caustic soda was added in a concentrated solution of approximately one part alkali in one to two parts water. This was added with extreme slowness, requiring 15 to 20 minutes for the 30 lbs. solution required. During this time constant stirring was maintained in order to equalize and distribute the action of the caustic soda as fully as possible. When normal temperatures were used the result has not been obtained with less than 6 parts of NaOH per 100 parts of amylaceous base. The result consists in what is called the passing over or "coming across" of the mixture and may be described as follows: During the earlier stages of the addition of the caustic in the above example, little difference in the appearance of the mass was apparent. Soon, however, it became creamy and then more pasty and difficult to stir. When about half the caustic soda had been added, there was faintly observable a minute mottled effect on the surface of the mass being stirred, and it gradually assumed a translucent porcelain-like appearance. If at this time a little of the mixture was squeezed between glass plates portions of the mixture were observed to be transparent and almost invisible. Other portions presented much the appearance of the original mixture of water and suspended particles of starch. As the addition of caustic soda proceeded accumulations of clearer matter occurred on the sides of the vessel and on parts of the stirrers and finally when the proper amount of caustic had been added, the entire mass "passed over" or "came across," being converted from a mixture of suspended starch and water containing caustic to a homogeneous colloidal compound of starch, caustic and water. A little excess of caustic was preferably added to prevent decomposition of the compound by the carbonic acid or moisture of the air. As much as fourteen per cent. NaOH or the equivalent of other caustic may be used, leaving some free caustic in the prepared glue. The word "compound" is here used in the more modern chemical sense of matter connected within the limits of some quantitative relation to produce a definitely recognizable product having certain different physical characteristics. It is found that temperature affects the amount of caustic required to produce this result and it is believed that, as temperature affects the polymerizing or uniting power of the starch molecules one with another, so it affects the ability of a smaller quantity of caustic to satisfy or bring across a given quantity of starch. It is found that at successively increasing temperatures one is enabled to bring across the mixture with successively decreasing proportions of caustic.

When ordinary starch is heated with water, it absorbs enormous quantities of water, and if only two or three parts of water are used becomes of a stiff jelly-like form which must be very much diluted before it will be practically workable. It is found, however, that using the improved glue base and method of mixing the same, this water absorbing power can be greatly reduced and can be regulated, although the mixing is done with the same proportions of alkali and carbohydrate or else the same temperature, which have hitherto produced unworkable jellies or weakly adhesive pastes or mucilages. And by the use of cassava starch in particular, results can be secured entirely different from those hitherto produced. Thus, by proper adjustment of conditions of mixing one is able to produce this glue even with certain grades of untreated cassava carbohydrate. The preliminary treatment, however, substantially reduces the absorption of water by the starch and prevents it from becoming jelly-like and tough when afterward treated either with the water as above indicated or with the alkali, or both.

The first part of the process may also be carried out as follows: The cassava carbohydrate in dry form is taken and mixed with a small amount of water and agitated. To this batch is then added from ¼% to 1% by weight of sodium peroxid in the form of a solution of substantially 20 parts of water to one part of peroxid by weight. Shortly before or after this treatment or even simultaneously there is also added ¼% to ½% by weight of caustic soda in the form of a solution of about 10 parts of water to one part of caustic by weight. These proportions of reagents are based upon the weight of dry materials. This mixture is more or less continuously agitated for about twelve hours, but without the application of heat. The batch is then preferably removed, and dried, to make it ready for shipment to the consumer in dry form, if it is not to be used at the place where made. The peroxid of soda and alkaline solution are exceptionally well adapted for reducing the water absorptive power of the carbohydrate since they do very little damage to the material and their action is not so potent and detrimental as that of the stronger acids. By their use, therefore, the binding strength of the material is not reduced and an exceptionally fine glue results. It is found that it is not necessary to treat the carbohydrate with sodium peroxid and alkali at exactly the same time but that good results will be obtained even if the carbohydrate is treated with either one for a few minutes or even an hour before it is treated with the other. It is believed, however, that to obtain good results the carbohydrate should at least be treated with one in the presence of the other, or in such a manner that the other will be capable of carrying out its functions.

In the second part of the improved process, less than about three parts of water by weight to one part of the dry material are used and after adding the solvent it is found that even with such a small amount of water, the batch will assume a semi-fluid consistency much superior to that ordinarily obtained by the use of water alone and will not become jelly-like and tough as in former processes. The alkali added acts, it is believed, to dissolve more or less of the cellulose and carbohydrate, uniting with the same and with the water and forming a glue of very tenacious properties. The dry carbohydrate is mixed with the water with a carefully regulated heat, if any. The action of heat replaces the action of a portion of the caustic is transforming the glue base, as explained above, and it is believed that the heat polymerizes the starch molecules (as in jellifying) so that one molecule of caustic combines to satisfy several starch molecules, and as the temperature is increased the quantity of caustic required is diminished. By the preliminary treatment in reducing the water absorbing power of the carbohydrate, a very concentrated mixture with water may be obtained.

Experiments indicate that, after the carbohydrate base has been treated in accordance with the first step of the process, the proportion of amylo-cellulose in the carbohydrate granule has been increased. It is believed this increase in the percentage or proportion of the amylo-cellulose in the carbohydrate allows the same to be changed into a good glue with very much less water than would otherwise be required. One way which has been found quite satisfactory for determining when the action of the acid or its equivalent, and the agitation, have been carried far enough in the first step, is as follows: When the carbohydrate glue base which has been dried is boiled for ten minutes with dry live steam at 100 lbs. pressure with 9 parts of water and tested for viscosity while hot, it shows a viscosity between that of cold water and three times that of cold water. In specific examples tried, the carbohydrate base, subjected to the above test, has shown viscosities between that of cold water and three times that of cold water, but a product showing about two times the viscosity of water is preferred. In measuring this viscosity 350 grams of base were mixed with 3150 cc. of cold water and 450 grams of the steam condensed therein and tested at 195° F. A Perkins viscosimeter was used, which may be constructed of brass tubing 1.295 inches outside diameter, 0.012 inch thick, and 3 inches long, and having a flat brass bottom 0.080 inch thick soldered into the end, having a round center hole 0.070 inch in diameter, the total weight being 39.63 grams, and all edges being made smooth removing practically no weight, the hole being polished until the cup placed quickly at its floating level in water at 60° F. floats upright and fills up to the point of sudden sinking by top overflow in 16 seconds.

If the material directly from the treatment tank of the first step is to be tested, a small quantity is taken, neutralized and diluted with cold water to 4¼° Bé. 3150 cc. of this thoroughly mixed batch are then taken in a vessel and the steam similarly admitted to the bottom of the batch, but this is found to indicate about 6½ seconds lower.

The carbohydrate glue base of the first step is not a "soluble starch" (giving clear solutions in hot water) and it is not a "modified starch" (swelling and gelatinizing in cold water).

When treated in accordance with the process, it is found that the carbohydrate glue base may be formed into glue by using only from one to three parts of water, but since the more water used the greater the delay in drying, preferably less than 4½ parts of water should be used in making the glue from the carbohydrate base.

It is believed that the variation of the tenacious properties, when the carbohydrate base is treated with water and a strong solution of an alkali, may be traced to the proper proportioning of viscosity, cohesion and adhesion, together with the peculiar chemical action which caustic (loosely combined or free in the glue, as applied), exerts on the cellulose which it in turn combines or reacts with, in making the joint, to form alkali metal carbonate, bicarbonate and acetate. It is believed this proper proportioning is due to the partial change of the integument and the consequent proper proportioning of the amylo-cellulose and the granulose (or the proper means polymerization) when united with the caustic and water. Consequently, it is believed that to obtain the best results it is necessary to abstain from reducing the cellulose to true soluble starch, and that sufficient cellulose must be left to make the glue amply tenacious. Therefore, the action of the acid and alkali should not be carried so far nor the temperature be so high as to destroy all the amylo-cellulose and impair its strength by changing it into soluble starch and the starch into sugar or dextrin. Also, in actual practice it has been found that a good glue is produced by treating the base with the chemicals to reduce the water absorbing power to a point where the base if mixed with from 2 to 3 parts of water and subjected to heat of 170° F. would result in a syrupy condition instead of a thick jelly-like mass. It has been found that by such suitable treatment under the process it is possible to produce from the base long filaments having a strength similar to threads of animal glue. Practically all the water must be later removed that goes into the glue solution and is applied to the joints, hence an increase of water in the glue solution involves changes in drying methods, or in drying time, or in risks of injury to the material due to warping by the extra water, all of very serious consequence. The diluted or adulterated pastes hitherto made from the natural carbohydrates are unfit for many classes of work and especially wood joint work, since the physical properties have not been properly proportioned and they contain so much water or adulterants that it takes the joints very long to dry or when they do become dry there is so little binding material left that only a very weak bond is obtained. Thus it is of the greatest importance and value to the production of a good joint to have a concentrated glue solution ready for application, which parallels the animal glue solutions now employed industrially, in respect to water contents and physical properties in application, and is equal or superior as to strength and permanency.

Certain advantages of the improved process may be obtained to some extent even although other materials be mixed with the amylaceous material to form the glue base.

While the description above has pointed out certain ways in which the glue may be made and applied, nevertheless the glue may be made and applied in any other way or ways found desirable as long as a joint is obtained possessing substantially the features claimed.

In the preferred form described the improved glue is transparent and free from odor, and is very stable after mixing for use. It has been found that it is instantly adhesive to clean surfaces. Its cohesion is very great but not sufficient to overcome its adhesion and its viscosity low enough to permit ready application, but so proportioned to its cohesion that it is capable of being applied by machinery like hide glue, but still very long tough fibers are produced if freshly joined surfaces are separated. It has been found that, owing to the breakage of these filaments quick separation of such surfaces produces a crackle like electric sparks. The glue will produce joints which are practically unaffected by natural humidity and which are unaffected by prolonged dry heat. It will form a joint for instance, between two pieces of wood or other cellulosic material, which joint is distinguished from ordinary mucilage, size and paste joints by the fact that it consists of the following layers in the order named; unaltered cellulosic material, cellulosic material altered by caustic, tough amylaceous material altered by caustic, cellulosic material altered by caustic and unaltered cellulose as schematically illustrated in the drawing which does not attempt to show the microscopic interlocking of the edges of the layers. This joint can probably be distinguished wherever found, by the shading of the above layers into one another when stained with iodin and examined under the microscope, and by other tests. Glued up panels have been placed behind a radiator for 18 months without cracking or separating of the glue joint. These features make the glue especially advantageous for purposes in which other glues are practically useless.

The improved joint is made in much the same manner as the ordinary machine glue joint when using hide glue, and any suitable applying machinery may be used. When two sheets or pieces of cellulosic material are joined by this glue an article of manufacture is produced which has an intervening stratum or layer characterized by the fact that it shows products evidencing the action of a solvent of cellulose on the fiber. Pieces of wood or the like may be thus built up of two or more layers and then used as panels, table tops or for any other purpose. Since, however, chemical action between certain constituents of the glue and the cellulose fiber is one of the desiderata and since the vigor of this action depends on concentration, it is preferred to have the veneers or other wooden pieces as dry as convenient that chemical action may not be retarded or too much diffused through the cellulose mass. Also it is preferred to hasten and localize this action by then subjecting the glued up work to a brief drying treatment while still "locked up" between pressing clamps to insure the intimate contact necessary to chemical action between the glue and the material being joined. After spreading the dry material thereon it is preferably compressed in the usual manner and locked in place while drying for a slightly longer time (say for 24 hours) than is usual with animal glue. Thereafter dryness or ordinary moisture and time continue to improve the character of the joint instead of deteriorating, opening or cracking it. As above stated when applied to form joints between cellulosic material such as wood the caustic loosely combined or free acts upon the cellulosic material so that a joint is formed in which is found alkali metal carbonate, or bicarbonate or both and acetate. These compounds calculated as sodium hydroxid are preferably between 3 and 14 per cent. by weight of the amylaceous matter. The above action on the wood whereby the carbonate, bicarbonate and acetate are formed, it is believed, materially enhances the strength and durability of the joint.

Although the improvements have been described in great detail nevertheless many changes and modifications may be made without departing from the spirit and scope of the invention in its broadest aspects.

No claim is made herein to the glue itself or to the process or any of the steps for making the glue, but What is desired to be secured by Letters Patent, is:

1. An article of manufacture consisting of two pieces of cellulosic material joined by a layer having a strength superior to the mean lateral strength of wood, which layer consists chiefly of amylaceous matter and alkali metal carbonate, bicarbonate and acetate, the total amount of said compounds calculated as sodium hydroxid being between 3 and 14 per cent. by weight of amylaceous matter.

2. An article of manufacture embracing cellulosic material joined by a layer having a strength superior to the mean lateral strength of wood, which layer contains starch and products of interaction between free caustic metal alkali and the material being joined.

3. An article of manufacture embracing cellulosic material joined by a layer having a strength superior to the mean lateral strength of wood, which layer is made from a vegetable carbohydrate glue containing free caustic, in which the caustic has combined to form a carbonate or bicarbonate and an acetate.

4. An article of manufacture embracing cellulosic material joined by a layer having a strength superior to the mean lateral strength of wood which layer contains chiefly starchy material, water and alkaline metal acetate and an alkaline metal carbonate or bicarbonate, the amount of said compounds calculated as sodium hydroxid being between three and fourteen per cent. by weight of starchy material.

5. An article of manufacture consisting of two pieces of wood joined by a layer having a strength superior to the mean lateral strength of the wood which layer consists chiefly of amylaceous matter.

6. An article of manufacture consisting of two pieces of wood joined by a layer having a strength superior to the mean lateral strength of the wood, which layer consists chiefly of amylaceous matter and compounds evidencing the action of a solvent of cellulose on the wood fiber, the amount of said compounds calculated as sodium hydroxid being between 3 and 14 per cent. by weight of amylaceous matter.

7. An article of manufacture consisting of two pieces of wood joined by a layer having a strength superior to the mean lateral strength of the wood, which layer consists chiefly of amylaceous matter in juxtaposition with the fibrous material being joined, the fibers of which show the action of a solvent of cellulose.

8. An article of manufacture embracing cellulosic material joined by a layer having a strength superior to the mean lateral strength of wood to form the following layers, cellulosic material altered by caustic or its equivalent and tough amylaceous material altered by caustic or its equivalent.

9. Two pieces of wood joined by a layer having a strength superior to the mean lateral strength of the wood, which layer embraces the following layers in the order named, cellulosic material altered by caustic, tough amylaceous material altered by caustic, and cellulosic material altered by caustic.

In testimony whereof I have signed my name to this specification in the presence of two subscribing witnesses.

GERTRUDE S. PERKINS,
*Executrix of the last will and testament of Frank G. Perkins.*

Witnesses:
R. C. WENDT,
L. MCMILLEN.

PERKINS GLUE COMPANY, [L. S.]
*Assignee,*
By JULIUS B. B. STRYKER,
*Vice President.*

Witnesses:
A. A. SOUDER,
EARLY F. GILBERT.